US011753022B2

(12) United States Patent
Lin et al.

(10) Patent No.: US 11,753,022 B2
(45) Date of Patent: *Sep. 12, 2023

(54) SYSTEMS AND METHODS FOR VEHICLE LOAD DETECTION AND RESPONSE

(71) Applicant: Gogoro Inc., Hong Kong (CN)

(72) Inventors: Sung-Ching Lin, New Taipei (TW); Kai-Chiang Li, New Taipei (TW)

(73) Assignee: Gogoro Inc., Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/578,543

(22) Filed: Sep. 23, 2019

(65) Prior Publication Data
US 2020/0223446 A1 Jul. 16, 2020

Related U.S. Application Data

(63) Continuation of application No. 15/173,451, filed on Jun. 3, 2016, now Pat. No. 10,421,462.
(Continued)

(51) Int. Cl.
*B60W 40/13* (2012.01)
*B60L 3/06* (2006.01)
(Continued)

(52) U.S. Cl.
CPC .......... *B60W 40/13* (2013.01); *B60L 3/0061* (2013.01); *B60L 3/06* (2013.01); *B60L 3/12* (2013.01);
(Continued)

(58) Field of Classification Search
CPC ................. B60L 15/20; B60L 2240/12; B60L 2240/421; B60L 2240/423;
(Continued)

(56) References Cited

U.S. PATENT DOCUMENTS 4,853,605 A * 8/1989 Matsuo .................. G01R 25/00
68/12.02
5,600,215 A * 2/1997 Yamada ................. B60L 15/36
318/434
(Continued)

FOREIGN PATENT DOCUMENTS

DE 112013000565 T5 11/2014
JP 2003087911 A 3/2003
(Continued)

OTHER PUBLICATIONS

Indian Office Action issued for copending IN Application No. 201717047086, Applicant: Gogoro Inc., dated Oct. 4, 2021, 6 pages.
(Continued)

*Primary Examiner* — Daniel L Greene
(74) *Attorney, Agent, or Firm* — Perkins Coie LLP

(57) ABSTRACT

A torque-speed curve or data of load that is used as a standard to determine an external condition in which an electric vehicle is operating such as incline or no incline, head wind or no headwind, high temperature or low temperature. The system compares samples of actual torque-speed of load data to the standard. Based on the comparison, the system determines the external condition (going up a hill, traveling into a headwind, operating at high temperature) or an abnormal operation of the vehicle powertrain, for example, low tire pressure, elevated friction, wheels out of alignment. Based on the determination, the system takes an action to govern a maximum torque output of the motor to control temperature of the vehicle battery; to raise a wind deflector; to govern maximum speed of the vehicle to reduce danger resulting from low tire pressure, elevated powertrain friction or out of alignment wheels; or to initiate an indication of abnormal conditions.

15 Claims, 8 Drawing Sheets

Related U.S. Application Data

(60) Provisional application No. 62/171,923, filed on Jun. 5, 2015.

(51) Int. Cl.
  *B60L 15/20* (2006.01)
  *B60L 3/00* (2019.01)
  *B60L 3/12* (2006.01)

(52) U.S. Cl.
  CPC ........... *B60L 15/20* (2013.01); *B60L 2240/12* (2013.01); *B60L 2240/421* (2013.01); *B60L 2240/423* (2013.01); *B60L 2240/642* (2013.01); *B60L 2260/167* (2013.01); *B60W 2300/365* (2013.01); *B60W 2510/083* (2013.01); *B60W 2520/105* (2013.01); *Y02T 10/64* (2013.01); *Y02T 10/72* (2013.01); *Y02T 90/16* (2013.01)

(58) Field of Classification Search
  CPC ......... B60L 2240/642; B60L 2260/167; B60L 3/0061; B60L 3/06; B60L 3/12; B60W 2300/365; B60W 2510/083; B60W 2520/105; Y02T 10/72; Y02T 90/16; Y02T 10/64
  See application file for complete search history.

(56) References Cited

U.S. PATENT DOCUMENTS

| | | | | |
|---|---|---|---|---|
| 5,852,264 A | * | 12/1998 | Muller | B66B 1/3484 187/292 |
| 8,359,829 B1 | * | 1/2013 | Ramberg | F02D 41/1453 60/285 |
| 9,045,127 B2 | | 6/2015 | Tashiro | |
| 9,187,093 B1 | * | 11/2015 | Sujan | B60W 30/143 |
| 2003/0034187 A1 | * | 2/2003 | Hisada | B60W 10/06 180/65.285 |
| 2007/0246275 A1 | * | 10/2007 | Dreibholz | B60L 15/2054 180/65.25 |
| 2010/0042281 A1 | * | 2/2010 | Filla | B60Q 5/00 903/903 |
| 2010/0259374 A1 | * | 10/2010 | Matsuo | B60K 35/00 340/439 |
| 2012/0029779 A1 | * | 2/2012 | Dickinson | F16H 61/702 701/69 |
| 2012/0077632 A1 | * | 3/2012 | Babbitt | B60K 6/12 475/1 |
| 2013/0304339 A1 | * | 11/2013 | Shattuck | F16D 48/06 701/68 |
| 2013/0304340 A1 | * | 11/2013 | Shattuck | B60W 10/10 701/68 |
| 2014/0095056 A1 | * | 4/2014 | Rademacher | F02D 17/04 701/112 |
| 2014/0172253 A1 | * | 6/2014 | Palmer | F16H 61/0213 701/56 |
| 2015/0112577 A1 | * | 4/2015 | Velusamy | F02D 41/2422 701/110 |
| 2015/0166045 A1 | * | 6/2015 | Chen | B60L 58/12 701/22 |
| 2015/0233470 A1 | * | 8/2015 | Seay | F16H 61/0213 701/55 |

FOREIGN PATENT DOCUMENTS

| | | | |
|---|---|---|---|
| JP | 2003335230 A | * | 11/2003 |
| JP | 2012512625 A | | 5/2012 |
| JP | 2015077963 A | | 4/2015 |
| WO | 2013160014 A1 | | 10/2013 |

OTHER PUBLICATIONS

Japanese Office Action received for co-pending Japanese Patent Application No. JP2017-563057; Applicant; Gogoro Inc.; dated Aug. 18, 2020, 8 pages.

Lu et al., "Torque-based Optimal Acceleration Control for Electric Vehicle", Chinese Journal of Mechanical Engineering, Mar. 2014, vol. 27 No. 2, pp. 319-330.

European Office Action issued for EP Application No. 16804593.8, Applicant: Gogoro Inc., dated Dec. 11, 2020, 11 pages.

* cited by examiner

| Initial Temperature from GoStation | 20°C | 25°C | 30°C | 35°C | 40°C | 44°C |
|---|---|---|---|---|---|---|
| Power limit | | | | | | |
| 3500W (48km/h) | (33) / 23 | (33) / 21 | (33) / 20 | 30 / 18 | 25 / 15 | 22 / 12 |

*FIG. 6*

SYSTEMS AND METHODS FOR VEHICLE LOAD DETECTION AND RESPONSE

BACKGROUND

Technical Field

The present disclosure generally relates to vehicles which employ electric motors as the prime mover or traction motor and, in particular, detection of a current load such vehicles are subject to.

Description of the Related Art

Hybrid and all electrical vehicles are becoming increasingly common. Such vehicles may achieve a number of advantages over traditional internal combustion engine vehicles. For example, hybrid or electrical vehicles may achieve higher fuel economy and may have little or even zero tail pipe pollution. In particular, all electric vehicles may not only have zero tail pipe pollution, but may be associated with lower overall pollution. For example, electrical power may be generated from renewable sources (e.g., solar, hydro). Also for example, electrical power may be generated at generation plants that produce no air pollution (e.g., nuclear plants). Also for example, electrical power may be generated at generation plants that burn relatively "clean burning" fuels (e.g., natural gas), which have higher efficiency than internal combustion engines, and/or which employ pollution control or removal systems (e.g., industrial air scrubbers) which are too large, costly or expensive for use with individual vehicles.

Personal transportation vehicles such as combustion engine powered scooters and/or motorbikes are ubiquitous in many places, for example in the many large cities of Asia. Such scooters and/or motorbikes tend to be relatively inexpensive, particular as compared to automobiles, cars or trucks. Cities with high numbers of combustion engine scooters and/or motorbikes also tend to be very densely populated and suffer from high levels of air pollution. When new, many combustion engine scooters and/or motorbikes are equipped as a relatively low polluting source of personal transportation. For instance, such scooters and/or motorbikes may have higher mileage ratings than larger vehicles. Some scooters and/or motorbikes may even be equipped with basic pollution control equipment (e.g., catalytic converter). Unfortunately, factory specified levels of emission are quickly exceeded as the scooters and/or motorbikes are used and either not maintained and/or as the scooters and/or motorbikes are modified, for example by intentional or unintentional removal of catalytic converters. Often owners or operators of scooters and/or motorbikes lack the financial resources or the motivation to maintain their vehicles.

It is known that air pollution has a negative effect on human health, being associated with causing or exacerbating various diseases (e.g., numerous reports tie air pollution to emphysema, asthma, pneumonia, and cystic fibrosis, as well as various cardiovascular diseases). Such diseases take large numbers of lives and severely reduce the quality of life of countless others.

BRIEF SUMMARY

A method of determining a load characteristic of an electric vehicle may be summarized as including obtaining real-time data regarding powertrain operation of a vehicle over a period of time; and determining whether the vehicle is subject to a particular type of load over the period of time based on comparing the obtained real-time data regarding the powertrain operation of the vehicle to reference data, the reference data including data regarding powertrain operation that is characteristic of when the vehicle is subject a particular type of load. Obtaining the real-time data regarding powertrain operation of a vehicle may further include obtaining real-time data over the period of time from a power transmission system of the vehicle, the real-time data including data indicative of current motor torque of a motor of the vehicle as motor speed increases. The reference data may include data reference data indicating motor torque as motor speed increases that is characteristic of when the vehicle is subject to the particular type of load.

Determining whether the vehicle may be subject to a particular type of load over the period of time may include sampling the real-time data from the power transmission system at a particular sampling rate over a particular period of time; for each sampling of the real time data during the particular period of time: comparing the sampled real-time data from the power transmission to the reference data; determining whether the vehicle is currently being subject to the particular type of load at a time of the sampling based on the comparison made to the reference data at the sampling; and determining whether to increment a counter initialized at the beginning of the particular period of time based on the determination of whether the vehicle is currently being subject to the particular type of load at a time of the sampling; after the particular period of time has lapsed, comparing a value of the counter to a threshold value; and determining whether the vehicle was subject to the particular type of load over the particular period of time based on whether the value of the counter is greater than or equal to the threshold value based on the comparison.

The method may further include determining whether to limit an operational characteristic of the prime mover of the vehicle based at least in part on the determination whether the vehicle was subject to the particular type of load over the particular period of time. Determining whether the vehicle was subject to the particular type of load over the particular period of time may include determining whether the vehicle was climbing an inclined surface or traveling on a flat surface based on the comparing of the sampled real-time data from the power transmission to the reference data.

The method may further include repeating, over multiple periods of time of length equal to the particular period of time, the sampling, comparing the sampled real-time data, determining whether the vehicle is currently being subject to the particular type of load at a time of the sampling, determining whether to increment the counter, comparing the value of the counter to a threshold value after the particular period of time has lapsed and the determining whether to limit an operational characteristic of the prime mover of the vehicle based at least in part on the determination whether the vehicle was subject to the particular type of load. The particular sampling rate may be once every second. The particular period of time may be one minute.

The method may further include if it was determined the vehicle was subject to the particular type of load over the particular period of time, causing the vehicle to take an action at least in part in response to the determination the vehicle was subject to the particular type of load over the particular period of time. Causing the vehicle to take an action may include causing the vehicle to take an action to cause the motor torque of the vehicle to be at a particular amount of torque according to motor speed. Causing the vehicle to take an action may include limiting an operational characteristic of a prime mover of the vehicle. Limiting an operational characteristic of the prime mover of the vehicle may include limiting an operational characteristic of a prime mover of the vehicle to cause the motor torque of the vehicle to be at a particular amount of torque according to motor speed. The particular amount of torque according to motor speed may be defined by a derating curve indicative of desired motor torque versus motor speed. Causing the vehicle to take an action may include causing the vehicle to raise a wind deflector. Causing the vehicle to take an action may include governing max torque output of motor. Causing the vehicle to take an action may include governing max torque output of motor to control temperature of a battery of the vehicle powering a prime mover of the vehicle. Governing max torque output of motor to control temperature of the battery of the vehicle powering the prime mover may be performed in response to the battery temperature reaching a particular battery temperature threshold. The particular battery temperature threshold may be about 57 degrees Celsius. Causing the vehicle to take an action may include one or more of: limiting a voltage supplied to the electric motor of the vehicle; limiting an acceleration of the vehicle; limiting a current supplied to the electric motor of the vehicle; adjusting a temperature of a battery powering the prime mover of the vehicle.

The particular type of load may be associated with one or a combination of one or more of: a condition external to the vehicle; climbing an incline; climbing an incline of a particular gradient; traveling on a flat surface; weight of the vehicle; carrying additional weight; carrying a particular amount of additional weight; carrying a particular number of people; rolling resistance; a particular type of rolling resistance; type of tire; air pressure of one or more tires; nature of a ground surface on which the vehicle is traveling; friction between the vehicle and the ground surface; air resistance; size and shape of the vehicle; degree of streamlining of the vehicle; wind speed; crosswind speed; crosswind direction; headwind; headwind speed; problem of a power transmission system of the vehicle; problem with the powertrain of the vehicle; abnormality of the power transmission system of the vehicle; an abnormality of the powertrain of the vehicle; amount of resistance in the power transmission system of the vehicle; amount of resistance in the powertrain of the vehicle; amount of friction between moving components in the power transmission system of the vehicle; amount of friction between moving components in the powertrain of the vehicle; vehicle battery temperature; alignment of wheels; and abnormality of wheel alignment. The reference data may be in a form of a data curve showing reference motor torque versus reference motor speed that is characteristic of when the vehicle is subject to the particular type of load. Determining whether the vehicle is subject to a particular type of load over the period of time may include: determining whether the vehicle is traveling on a flat surface or an incline based on comparing the obtained real-time data regarding the powertrain operation of the vehicle to reference data; and determining whether there is an abnormality of the power train or power transmission system of the vehicle based on the determining whether the vehicle is traveling on a flat surface or an incline and on the comparing the obtained real-time data regarding the powertrain operation of the vehicle to reference data. The method may further include: if it was determined there is an abnormality of the power train or power transmission system of the vehicle, causing the vehicle to take an action to cause the motor torque of the vehicle to be at a particular amount of torque according to motor speed at least in part in response to the determination that there is an abnormality of the power train or power transmission system of the vehicle. The obtained real-time data regarding the powertrain operation of the vehicle to reference data may include data obtained from one or more sensors, the one or more sensors including sensors operable for gathering information regarding one or more of: vehicle acceleration, vehicle location, vehicle elevation, vehicle incline data, vehicle temperature, vehicle temperature, vehicle battery temperature, vehicle system component temperature, gyroscopic data; vehicle telematic data, vehicle telemetric data, wind speed, wind direction, accelerometer data, vehicle weight, tire air pressure and change in vehicle elevation. The method may further include: determining air tire pressure based on the determining whether the vehicle is subject to a particular type of load over the period of time. The method may further include: detecting a decrease of vehicle efficiency caused by a mechanical problem based on the determining whether the vehicle is subject to a particular type of load over the period of time.

A vehicle may be summarized as including: a prime mover coupled to drive at least one wheel of the vehicle; a main electrical power storage device that stores power; a power supply coupled and operable to selectively transfer electrical power between the main electrical power storage device and the prime mover; and a controller communicatively coupled to control the power supply, wherein the controller: obtains real-time data regarding powertrain operation of a vehicle over a period of time; and determines whether the vehicle is subject to a particular type of load over the period of time based on comparing the obtained real-time data regarding the powertrain operation of the vehicle to reference data, the reference data including data regarding powertrain operation that is characteristic of when the vehicle is subject a particular type of load.

A non-transitory computer readable storage medium may have computer executable instructions stored thereon that, when executed, cause at least one processor to: obtain real-time data regarding powertrain operation of a vehicle over a period of time; and determine whether the vehicle is subject to a particular type of load over the period of time based on comparing the obtained real-time data regarding the powertrain operation of the vehicle to reference data, the reference data including data regarding powertrain operation that is characteristic of when the vehicle is subject a particular type of load.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 6 is a chart showing example starting temperatures of batteries having had 100 and 500 charging cycles, respectively, and the distances traveled by the vehicle having such a battery when the battery temperature reaches 57° C.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with vending apparatus, batteries, super- or ultracapacitors, power converters including but not limited to transformers, rectifiers, DC/DC power converters, switch mode power converters, controllers, and communications systems and structures and networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

Reference to portable electrical power storage device or electrical energy storage device means any device capable of storing electrical power and releasing stored electrical power including, but not limited to, batteries, super- or ultracapacitors. Reference to batteries means a chemical storage cell or cells, for instance rechargeable or secondary battery cells including, but not limited to, nickel cadmium alloy or lithium ion battery cells.

The headings and Abstract of the Disclosure provided herein are for convenience only and do not interpret the scope or meaning of the embodiments.

Figure 1:
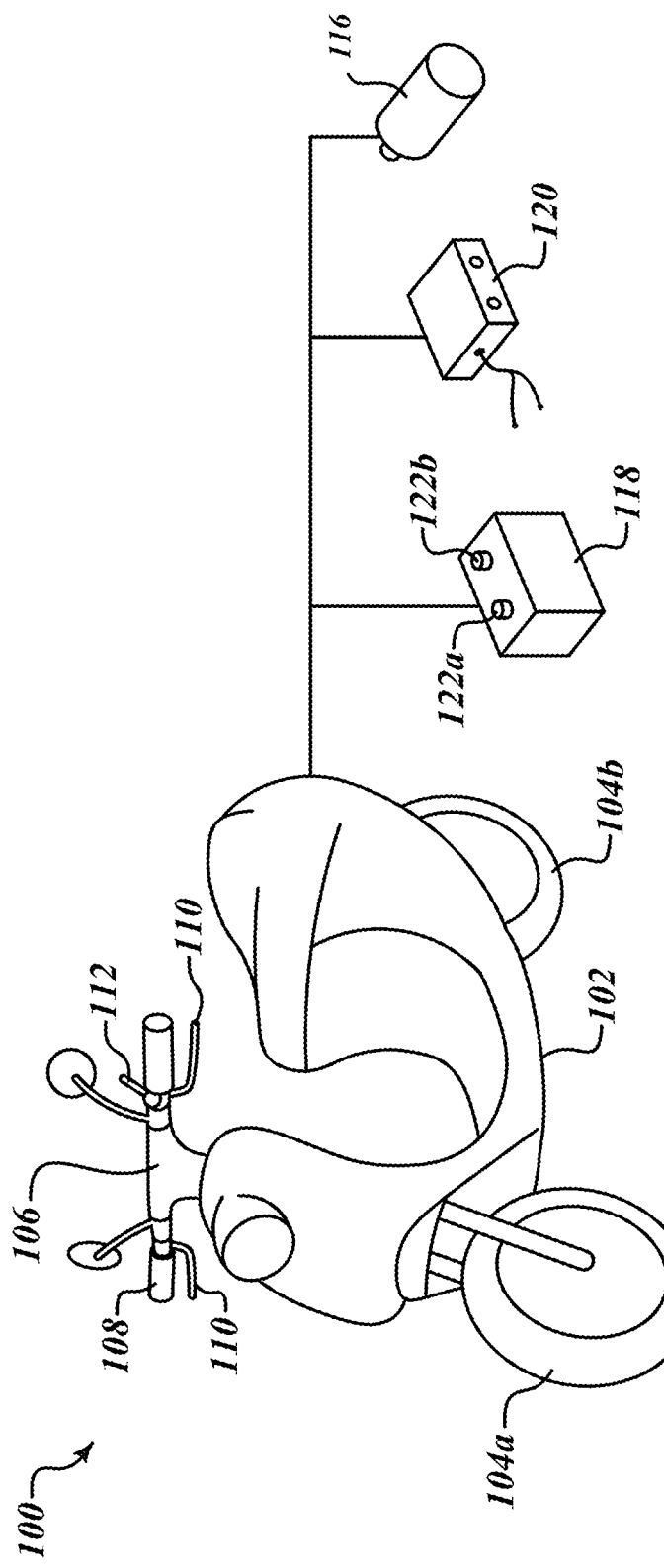
FIG. 1 is an isometric, partially exploded, view of an electric scooter or motorbike which may include the various components or structures described herein, according to one non-limiting illustrated embodiment.

FIG. 1 shows an electrically powered personnel transportation vehicle in the form of an electric scooter or motorbike 100, according to one illustrated embodiment.

As previously noted, combustion engine scooters and motorbikes are common in many large cities, for example in Asia, Europe and the Middle East. The ability to address performance or efficiency issues related to the use of electrical power storage devices (e.g., secondary batteries) as the main or primary source of power for a vehicle may foster the use of all-electric scooters and motorbikes 100 in place of internal combustion engine scooters and motorbikes, thereby alleviating air pollution, as well as reducing noise.

The electric scooter or motorbike 100 includes a frame 102, wheels 104a, 104b (collectively 104), and handle bar 106 with user controls such as throttle 108, brake levers 110, turn indicators switches 112, etc., all of which may be of conventional design. The electric scooter or motorbike 100 may also include a power system, which includes a traction electric motor 116 coupled to drive at least one of the wheels 104b, at least one main electrical power storage device 118 that stores electrical power to power at least the traction electric motor 116, and control circuit 120 which controls power distribution between at least the main electrical power storage device 118 and the traction electric motor 116.

The traction electric motor 116 may take any of a variety of forms, but typically will be a permanent magnet induction motor capable of producing sufficient power (Watts or horsepower) and torque to drive the expected load at desirable speeds and acceleration. The traction electric motor 116 may be any conventional electric motor capable of operating in a drive mode, as well as operating in a regenerative braking mode. In the drive mode, the traction electric motor consumes electrical power, to drive the wheel. In the regenerative braking mode, the traction electric motor operates as a generator, producing electric current in response to rotation of the wheel and producing a braking effect to slow a vehicle.

The main electrical energy storage devices 118 may take a variety of forms, for example batteries (e.g., array of battery cells) or super- or ultracapacitors (e.g., array of ultracapacitor cells). For example, the electrical energy storage devices 118 may take the form of rechargeable batteries (i.e., secondary cells or batteries). The electrical energy storage devices 118 may, for instance, be sized to physically fit, and electrically power, personal transportation vehicles, such as all-electric scooters or motorbikes 100, and may be portable to allow easy replacement or exchange. Given the likely demand imposed by the transportation application, main electrical energy storage devices 118 are likely to take the form of one or more chemical battery cells.

The electrical energy storage devices 118 may include a number of electrical terminals 122a, 122b (two illustrated, collectively 122), accessible from an exterior of the electrical energy storage device 118. The electrical terminals 122 allow charge to be delivered from the electrical energy storage device 118, as well as allow charge to be delivered to the electrical energy storage device 118 for charging or recharging the same. While illustrated in FIG. 1 as posts, the electrical terminals 122 may take any other form which is accessible from an exterior of the electrical energy storage device 118, including electrical terminals positioned within slots in a battery housing.

As better illustrated and described below, the control circuit 120 includes various components for transforming, conditioning and controlling the transfer of electrical power, particularly between the electrical energy storage device 118 and the traction electric motor 116.

Figure 2:
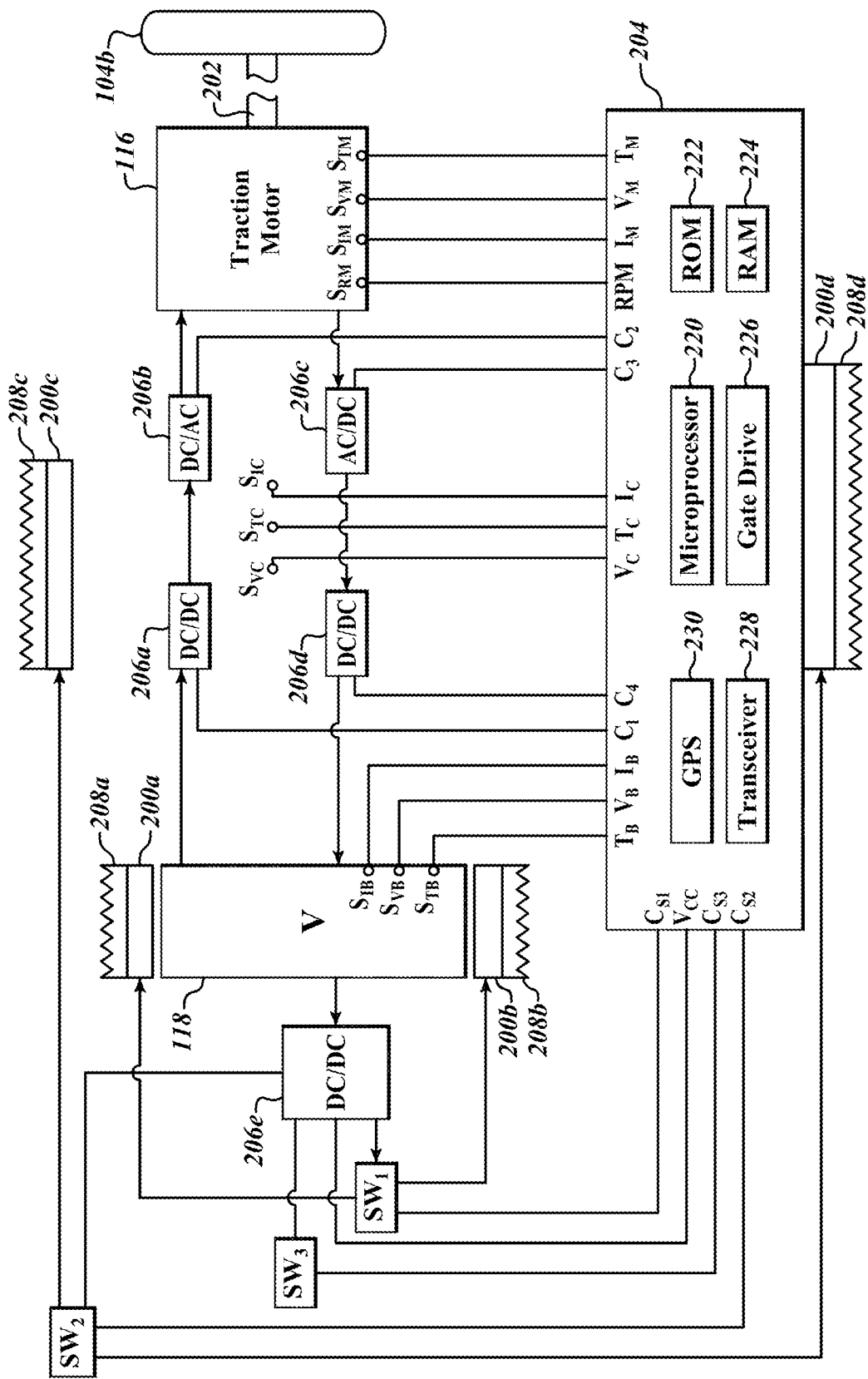
FIG. 2 is a block diagram of some of the components or structures of the scooter or motorbike of FIG. 1, according to one non-limiting illustrated embodiment.

FIG. 2 shows the portions of the electric scooter or motorbike 100, according to one illustrated embodiment. In particular, FIG. 2 shows an embodiment which employs the electrical energy storage device 118 to supply power generated by the traction electric motor 116 to be used for adjusting or controlling temperature of various components (e.g., electrical energy storage device 118 and/or circuitry) via a number of temperature adjustment devices, collectively 200.

As illustrated, the traction electric motor 116 includes a shaft 202, which is coupled either directly or indirectly to drive at least one wheel 104b of the electric scooter or motorbike 100. While not illustrated, a transmission (e.g., chain, gears, universal joint) may be employed.

The control circuit 120 may take any of a large variety of forms, and will typically include a controller 204, one or more power converters 206a-206e (five illustrated), switches $SW_1$-$SW_3$ (three illustrated) and/or sensors $S_{TB}$, $S_{VB}$, $S_{IB}$, $S_{TC}$, $S_{VC}$, $S_{IC}$, $S_{TM}$, $S_{VM}$, $S_{IM}$, $S_{RM}$.

As illustrated in FIG. 2, the control circuit 120 may include a first DC/DC power converter 206a that in a drive mode or configuration couples the electrical energy storage device 118 to supply power generated by the traction electric motor 116. The first DC/DC power converter 206a may step up a voltage of electrical power from the electrical energy storage device 118 to a level sufficient to drive the traction electric motor 116. The first DC/DC power converter 206a may take a variety of forms, for example an unregulated or a regulated switch mode power converter, which may or may not be isolated. For instance, the first DC/DC power converter 206a may take the form of a regulated boost switch mode power converter, or buck-boost switch mode power converter.

The control circuit 120 may include a DC/AC power converter 206b, commonly referred to as an inverter, that in the drive mode or configuration couples the electrical energy storage device 118 to supply power generated by the traction electric motor 116 via the first DC/DC converter 206a. The DC/AC power converter 206b may invert electrical power from the first DC/DC converter 206a into an AC waveform suitable to drive the traction electric motor 116. The AC wave form may be single phase or multi-phase, for example two or three phase AC power. The DC/AC power converter 206b may take a variety of forms, for example an unregulated or a regulated switch mode power converter, which may or may not be isolated. For instance, the DC/AC power converter 206b may take the form of a regulated inverter.

The first DC/DC power converter 206a and the DC/AC power converter 206b are controlled via control signals $C_1$, $C_2$, respectively, supplied via the controller 204. For example, the controller 204, or some intermediary gate drive circuitry, may supply pulse width modulated gate drive signals to control operation of switches (e.g., metal oxide semiconductor field effect transistors or MOSFETs, bipolar insulated gate transistors or IGBTs) of the first DC/DC and/or DC/AC power converters 206a, 206b.

As further illustrated in FIG. 2, the control circuit 120 may include an AC/DC power converter 206c, commonly referred to as a rectifier, that in a braking or regenerative braking mode or configuration couples the traction electric motor 116 to supply power generated thereby to the electrical energy storage device 118. The AC/DC power converter 206c may rectify an AC waveform produced by the traction electric motor 116 to a DC form suitable for supplying the electrical energy storage device 118 and optionally other components such as the control circuit 120. The AC/DC power converter 206c may take a variety of forms, for example a full bridge passive diode rectifier or a full bridge active transistor rectifier.

The control circuit 120 may also include a second DC/DC power converter 206d that electrically couples the traction electric motor 116 to the electrical energy storage device 118 via the AC/DC power converter 206c. The second DC/DC power converter 206d may step down a voltage of the electrical power generated by the traction electric motor 116 to a level suitable for the electrical energy storage device 118. The second DC/DC power converter 206d may take a variety of forms, for example an unregulated or regulated switch mode power converter, which may or may not be isolated. For instance, the second DC/DC power converter 206d may take the form of a regulated buck switch mode power converter, synchronous buck switch mode power converter, or buck-boost switch mode power converter.

The AC/DC power converter 206c and the second DC/DC power converter 206d are controlled via control signals $C_3$, $C_4$, respectively, supplied via the controller 204. For example, the controller 204, or some intermediary gate drive controller, may supply pulse width modulated gate drive signals to control operation of switches (e.g., MOSFETs, IGBTs) of the AC/DC and/or the second DC/DC power converters 206c, 206d.

As further illustrated in FIG. 2, the control circuit 120 may include a third DC/DC power converter 206e that electrically couples the electrical energy storage device 118 to various other components, for example the control circuit 120. The third DC/DC power converter 206e may step down a voltage of the electrical power supplied by the electrical energy storage device 118 to a level suitable for one or more other components. The third DC/DC power converter 206e may take a variety of forms, for example an unregulated or regulated switch mode power converter, which may or may not be isolated. For instance, the third DC/DC power converter 206e may take the form of a regulated buck switch mode power converter, synchronous buck switch mode power converter, or buck-boost switch mode power converter.

As also illustrated in FIG. 2, the temperature adjustment device(s) 200 may be located to control or adjust temperature of or proximate certain components.

The temperature adjustment device(s) 200 may be located proximate, adjacent to or in contact with one or more other components which would benefit by having active temperature management or handling. For example, a first number of temperature adjustment devices 200a, 200b (two illustrated) may be located proximate, adjacent to or in contact with the main electrical energy storage device 118, which supplies electrical power to the traction electric motor 116. A second number of temperature adjustment devices 200c may be located proximate, adjacent to or in contact with one or more of components or elements of the control circuit, for example one or more of the power converters 206a-206e. A third number of temperature adjustment devices 200d may be located proximate, adjacent to or in contact with one or more components of the controller 204. While illustrated proximate the first DC/DC power converter 206a and DC/AC power converter 206b, the temperature adjustment device 200c may additionally, or alternatively, be located proximate, adjacent to or in contact with the AC/DC power converter 206c or second DC/DC power converter 206d. Additionally, or alternatively, one or more temperature adjustment device 200 may be located proximate the third DC/DC power converter 206e. The temperature adjustment devices 200 may be powered from power generated by the traction electric motor 116, which power is generated thereby during regenerative braking operation. One or more switches $S_1$ (only one illustrated) may be operated in response to control signals CS1 from the controller 204 to selectively couple power to the temperature adjustment devices from the electrical energy storage device 118.

The temperature adjustment devices 200 may take a variety of forms. For example, one or more of the temperature adjustment devices 200 may take the form of Peltier devices, also known as Peltier effect devices. Such devices employ the Peltier effect to create a heat flux between a junction of two different types of materials. The Peltier device is a solid state active heat pump, which in response to a direct current transfers heat against a temperature gradient from one side to the other side of the device. The direction of heat transfer is controlled by the polarity of the applied DC voltage. Hence, such devices are sometimes referred to as Peltier cooler, Peltier heater or thermoelectric heat pump. One or more of the temperature adjustment devices 200 may, for example, take the form of a resistive heater.

One or more of the temperature adjustment devices 200 may include, or be thermally conductively coupled with one or more heat exchange devices 208a-208d (collectively 208). The heat exchange devices 208 may include heat sinks (i.e., a device that transfers heat from a solid material to a fluid such as air), heat spreaders (i.e., plate with relatively high thermal conductivity) and/or heat pipes (i.e., heat transfer device employing phase transition of a material), alone or in any combination. The heat exchange devices 208 will typically have a relatively large heat dissipation surface area as compared to the temperature adjustment devices 200. For example, the heat exchange devices 208 may include a plurality of fins, for example pin fins to maximize surface area for a given volume. The heat dissipation surfaces of the he heat exchange devices 208 may be positioned relative away from the specific components which are being cooled.

The controller 204 may take a variety of forms which may include one or more integrated circuits, integrated circuit components, analog circuits or analog circuit components. As illustrated the controller 204 includes a microcontroller 220, non-transitory computer- or processor readable memory such as a read only memory (ROM) 222 and/or random access memory (RAM) 224, and may optionally include one or more gate drive circuits 226. The controller 204 is operable to receive input from vehicle systems and other sensors, execute firmware code or other software and to generate signals to perform the actions described herein for vehicle load detection and response. For example, controller 204 may perform the operations and actions described in claims 1-31.

The microcontroller 220 executes logic to control operation of the power system, and may take a variety of forms. For example, the microcontroller 220 may take the form of a microprocessor, programmed logic controller (PLC), programmable gate array (PGA) such as a field programmable gate array (FPGS), and application specific integrated circuit (ASIC), or other such microcontroller device. The ROM 222 may take any of a variety of forms capable of storing processor executable instructions and/or data to implement the control logic. The RAM 224 may take any of a variety of forms capable of temporarily retaining processor executable instructions or data. The microcontroller 220, ROM 222, RAM 224 and optionally gate drive circuit(s) 226 may be coupled by one or more buses (not shown), including power buses, instructions buses, data buses, address buses, etc. Alternatively, the control logic may be implemented in an analog circuit.

The gate drive circuit(s) 226 may take any of a variety of forms suitable for driving switches (e.g., MOSFETs, IGBTs) of the power converters 206 via drive signals (e.g., PWM gate drive signals). While illustrated as part of the controller 204, one or more gate drive circuits may be intermediate the controller 204 and the power converters 206.

The controller 204 may receive signals from one or more sensors $S_{TB}$, $S_{VB}$, $S_{IB}$, $S_{TC}$, $S_{VC}$, $S_{IC}$, $S_{TM}$, $S_{VM}$, $S_{IM}$, $S_{RM}$. The controller may use the sensed information in controlling the temperature adjusting devices 200, for example starting heat transfer, stopping heat transfer, increasing a rate of heat transfer or even changing a direction of heat transfer. Such may be accomplished by application of control signals $C_{S1}$-$C_{S3}$ to select switches $SW_1$-$SW_3$. For example, control signals $C_{S1}$-$C_{S3}$ select switches $SW_1$-$SW_3$ to cause power (e.g., direct current) to be supplied to selected ones of the temperature adjustment devices 200, and to set a voltage level of the applied power and even a polarity of the applied powered.

A battery temperature sensor $S_{TB}$ may be positioned to sense a temperature of the main electrical power storage device 118 or ambient environment proximate the main electrical power storage device 118 and provide signals $T_B$ indicative of the sensed temperature.

A battery voltage sensor $S_{VB}$ may be positioned to sense a voltage across the main electrical power storage device 118 and provide signals $V_B$ indicative of the sensed voltage.

A battery charge sensor $S_{IB}$ may be positioned to sense a charge of the main electrical power storage device 118 and provide signals $I_B$ indicative of the sensed charge.

A power converter temperature sensor $S_{TC}$ may be positioned to sense a temperature of one or more of the power converters 206 or the ambient environment proximate the power converter(s) 206 and provide signals $T_C$ indicative of the sensed temperature.

A power converter voltage sensor $S_{VC}$ may be positioned to sense a voltage across one or more of the power converters 206 and provide signals $V_C$ indicative of the sensed voltage.

A power converter charge sensor $S_{IC}$ may be positioned to sense a charge through one or more of the power converters 206 and provide signals $I_C$ indicative of the sensed charge.

A traction motor temperature sensor $S_{TM}$ may be positioned to sense a temperature of the traction electric motor 116 or ambient environment proximate the traction electric motor 116 and provide signals $T_M$ indicative of the sensed temperature.

A traction motor voltage sensor $S_{VM}$ may be positioned to sense a voltage across the main electrical power storage device 118 and provide signals $V_M$ indicative of the sensed voltage.

A traction motor current sensor $S_{IM}$ may be positioned to sense a current flow through the traction electric motor 116 and provide signals $I_M$ indicative of the sensed current.

A traction motor rotational sensor $S_{RM}$ may be positioned to sense a current flow through the traction motor 116 and provide signals RPM indicative of the sensed rotational speed.

As discussed herein, the controller can use one or more of the sensed conditions to control operation of one or more of the temperature adjusting devices 200.

The controller 204 includes a transmitter and receiver which may be formed or denominated as a transceiver 228, which provides wireless communications with components or systems which are remote from the electric scooter or motorbike 100. The transceiver 228 may take a large variety of forms suitable to provide wireless communications. For example, the transceiver may take the form of a cellular phone chipset (also referred as a radio) and antenna(s) to carry on communications with a remote system via a cellular service provider network. The transceiver 228 may implement wireless communications approaches other than cellular based communications. Communications may include receiving information and/or instructions from a remote system or device, as well as transmitting information and/or instructions or queries to a remote system or device.

The controller 204 may include a global positioning system (GPS) receiver 230, which receives signals from GPS satellites allowing the controller 204 to determine a current location of the scooter or motorbike 100. Any of a large variety of commercially available GPS receivers may be employed. The present location or position may be specified in coordinates, for example a longitude and latitude, typically with an accuracy of under 3 meters. Alternatively, other techniques may be employed for determining the present location, elevation, incline or position of the scooter or motorbike 100. For example triangulation based on three or more cellular towers or base stations to determine location.

Elevation at a present location may be discernable or determined based on the GPS coordinates. Likewise, elevational changes between a current location and one or more other locations or destinations may be determined using a topographical mapping or other structured format that relates GPS coordinates with elevations. Such may be advantageously employed in better estimating a range of the electric scooter or motorbike 100. Alternatively, or additionally, the electric scooter or motorbike 100 may include an altimeter that detects elevation, or other sensors, for example an accelerometer, that detects changes in elevation. Such may allow potential energy associated with a relative position of the electric scooter or motorbike 100 with respect to hills (e.g., top of hill, bottom of hill) to be taken into account when determining an estimate range. Such may advantageously produce more accurate or estimated range, preventing unnecessary limiting of operational performance.

Figure 3:
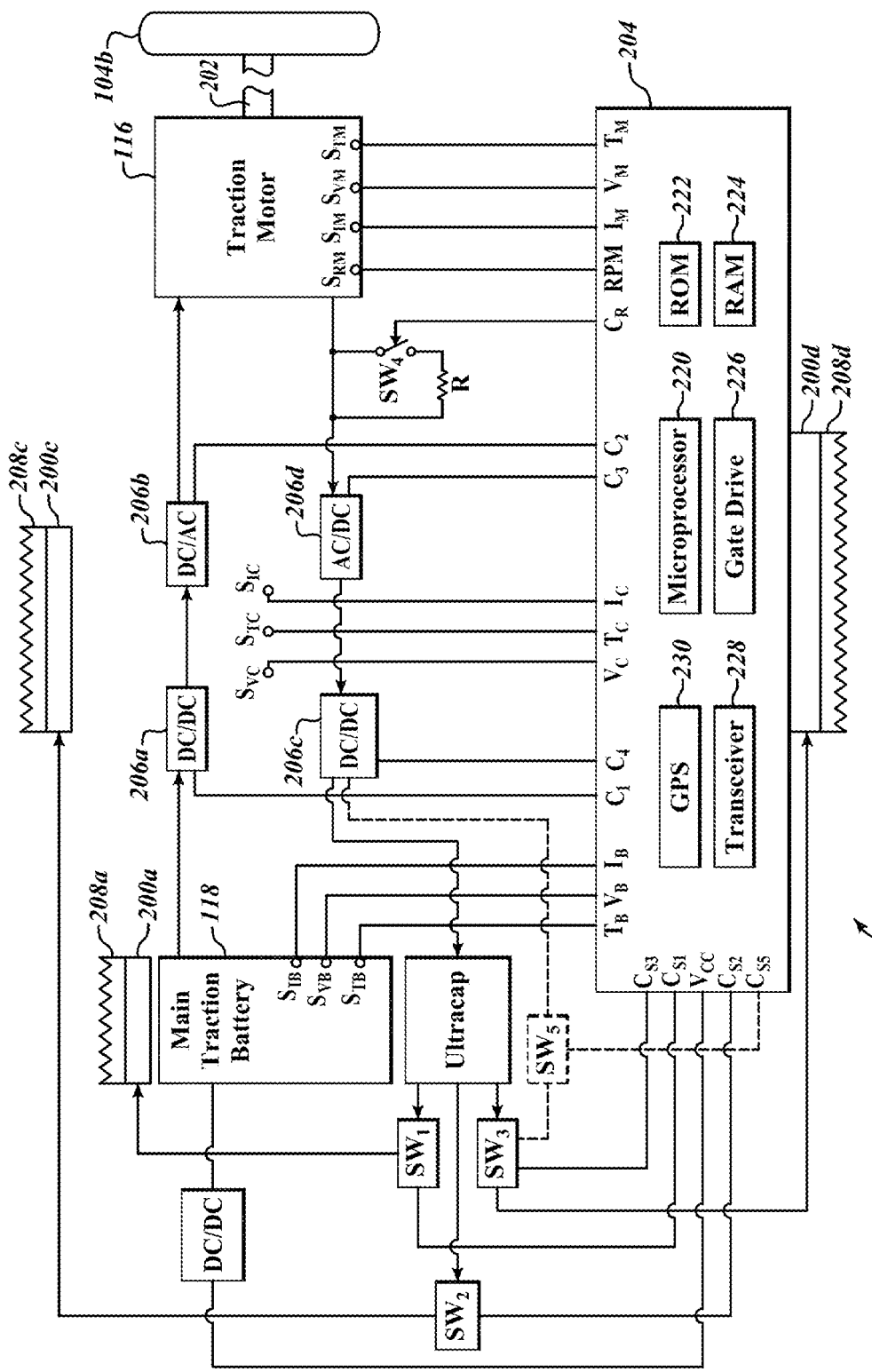
FIG. 3 is a block diagram of some of the components or structures of the scooter or motorbike of FIG. 1, according to another non-limiting illustrated embodiment.

FIG. 3 shows portions of the electric scooter or motorbike 100, according to another illustrated embodiment. In particular, FIG. 3 shows an embodiment which employs an auxiliary electrical energy storage device 300 to supply power generated by the traction electric motor 116 to be used for adjusting or controlling temperature of various components (e.g., electrical energy storage device 118 and/or circuitry) via a number of temperature adjustment devices 200. The auxiliary electrical energy storage device 300, is in addition to the main electrical energy storage device 118 which is still used to supply power to the traction electric motor 116. Many of the structures and/or components are similar, or even identical, to those illustrated and described with reference to FIG. 2, above. Such structures and components will share the same reference numbers as used in FIG. 2, and will not be described in further detail. Only some of the significant differences are described immediately below.

As noted, the embodiment of FIG. 3 adds an auxiliary electrical energy storage device 300. Electrical power generated by the traction electrical motor operating in regenerative braking mode is supplied to the auxiliary electrical energy storage device 300, for example via the AC/DC converter 206*c* and/or DC/DC converter 206*d*. The auxiliary electrical energy storage device 300 is illustrated as one or more super- or ultracapacitors, although such can take a variety of forms, for example a chemical battery. Since the auxiliary electrical energy storage device 300 does not drive the traction electric motor 116, greater flexibility is allowed in selecting the form. Thus, the auxiliary electrical energy storage device 300 may be selected based on a desired characteristic, such as performance at the expected voltages, charge capacity, and/or temperatures at which the auxiliary electrical energy storage device 300 will operate. The choice of an ultracapacitor may realize efficiencies over a chemical battery, particularly with respect to discharging and/or charging operations at relatively high ambient temperatures The switches $SW_1$-$SW_3$ are now operable to selectively couple the auxiliary electrical energy storage device 300 to the temperature adjustment devices 200.

The embodiment of FIG. 3 may also include a dump or dissipation resistor R and a switch $SW_4$ operable in response to control signals $C_R$ from the control circuit 120 to selectively couple the resistor R in parallel between the traction electric motor 116 and the AC/DC power converter 206*c*. Such may allow excess electrical energy to be dissipated as heat, for example where the energy generated during regenerative braking operation is too much for the auxiliary electrical energy storage device 300.

The embodiment of FIG. 3 may additionally, or alternatively, include a direct coupling switch $SW_5$ which is operable in response to control signals $C_{S5}$ from the control circuit 120 to provide a direct electrical coupling between the electrical power generated by the traction electric motor operating in regenerative braking mode and the temperature adjusting devices 200 without any intervening batteries or ultracapacitors.

Figure 4:
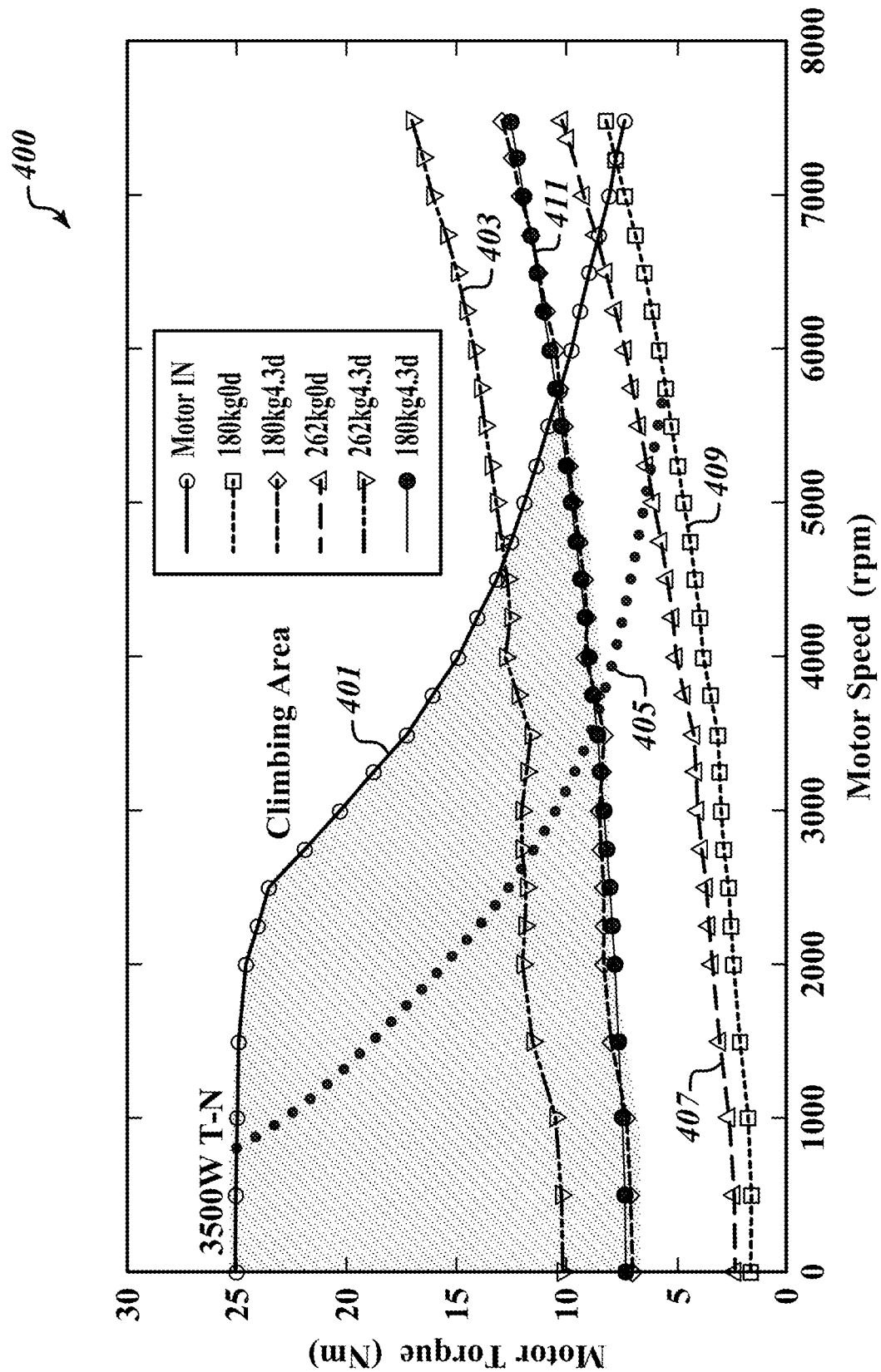
FIG. 4 is a graph showing example reference motor torque versus motor speed values characteristic of various types of vehicle loads, including climbing, and an example derating curve according to a non-limiting illustrated embodiment.

FIG. 4 is a graph 400 showing example reference motor torque versus motor speed values characteristic of various types of vehicle loads, including climbing, and an example derating curve 405 according to a non-limiting illustrated embodiment. Using such data, the systems and methods described herein may detect a particular type of vehicle load (such as the vehicle climbing a hill) and, for example, limit the battery temperature during climbing. For example, it may be important to limit battery temperature so (1) permanent damage to the battery is avoided and (2) extend the travel range of the battery.

The system may generate a reference torque-speed curve 401 as shown in FIG. 4 or other data characteristic of particular type of load (also referred to as "road load") that will be used as a standard (the "standard") to help determine external an condition vehicle is operating in, e.g. incline or no incline, head wind or no headwind, high temperature or low temperature, etc. In some embodiments, such reference data is already generated. The controller compares samples of actual torque-speed of load data to the standard. Based on comparison, the system determines (a) external condition (going up a hill, traveling into a headwind, operating at high temperature) or (b) abnormal operation of powertrain, e.g. low tire pressure, elevated friction or wheels out of alignment. Based on determination (a) or (b), the controller takes an action, e.g., implements the derating curve 405 to govern max torque output of motor to control temperature of battery, raise wind deflector, govern max speed of vehicle to reduce danger resulting from low tire pressure, elevated powertrain friction or out of alignment wheels or initiate an indication of abnormal conditions. In some embodiments, when the controller is trying to identify abnormal operation of the powertrain, a determination that the vehicle was on a flat road would be made before taking an action. These actions may be performed by the controller or a system remote form the controller that provides such data to the controller based on data received from the vehicle.

Instead of a torque-speed curve as shown in FIG. 4, the data used that is characteristic of particular type of load may be represented by a reference curve of motor current that includes motor current data that corresponds to the applicable torque-speed curve characteristic of when the vehicle is being subject to a load associated with the applicable torque-speed curve. In this instance the motor current of the vehicle may be sampled and such sampled values compared to those in the reference curve of motor current to determine in the vehicle is being subject to the load associated with the applicable curve of motor current and corresponding torque-speed curve (e.g., to determine whether the vehicle is traveling uphill or on a flat surface).

With reference to FIG. 4, data that can be obtained from the power transmission system is compared with a curve or data of load to determine the change of torque-speed curve or detect a problem of the power transmission. A vehicle can generate many curves of load under different load conditions. A curve of load is selected to determine whether the vehicle is climbing an incline or driving along a flat road. When the vehicle enters a mode using the derating curve, energy consumption can be reduced and thus performance is not compromised too much.

There are four example speed-torque curves of load or load torque curves shown in FIG. 4: from bottom to top, the first curve 409 is built from data obtained when a vehicle carries one person and moves on a flat road, the second curve 407 is built from data obtained when a vehicle carries two persons and moves on a flat road, the third curve 411 is built from data obtained when a vehicle carries one person and climbs an incline, and the fourth curve 403 is built from data obtained when a vehicle carries two persons and climb an incline.

Figure 5:
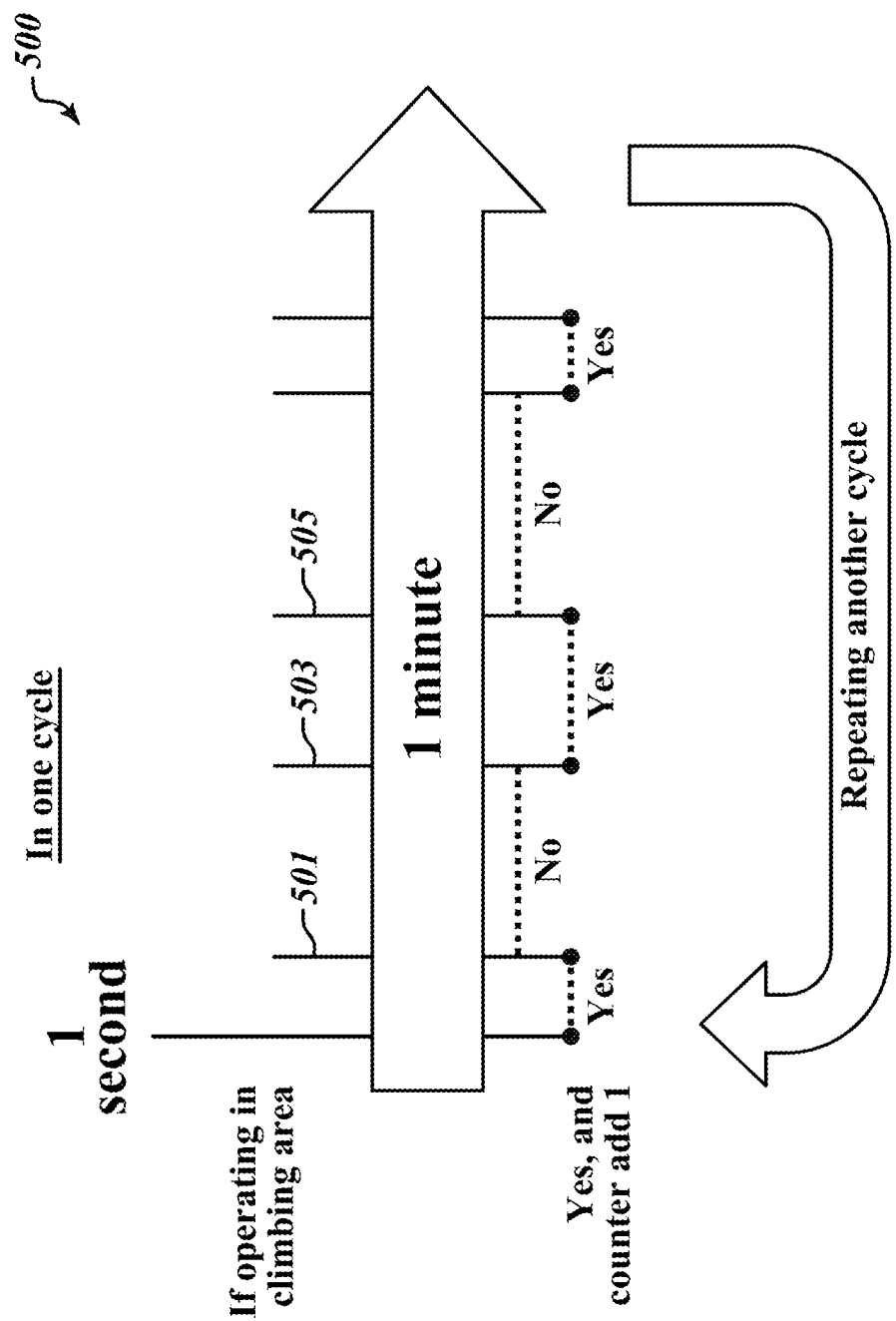
FIG. 5 is an example timing diagram of a process for determining whether the vehicle is subject to a particular type of load over a period of time including an example sampling real-time data from the power transmission system at a particular example sampling rate, according to one non-limiting illustrated embodiment.

FIG. 5 is an example timing diagram 500 of a process for determining whether the vehicle is subject to a particular type of load over a period of time including an example sampling real-time data from the power transmission system at a particular example sampling rate, according to one non-limiting illustrated embodiment.

In one example embodiment, the counter is accumulated in each cycle or fixed time, one minute in this example. Data is obtained or sampled each second. When data shows the vehicle is climbing an incline, at points 501, 503 and 505, for example, the counter is added by one. When the cycle is finished, the number of the counter is compared with a threshold, 36 in this example. If the counter is greater than or equal to the threshold, the vehicle is switched into the "eco-mode" using a derated or power-limiting curve. Various other values for the sampling rate, cycle time and threshold values may be used in various other embodiments. For example, such values may be selected based on desired vehicle performance and accuracy of measurements.

The vehicle can use a torque speed curve other than the peak torque speed curve when the vehicle is driven on an incline. The determination of whether the vehicle is climbing on an incline is based on the behavior or performance of the powertrain of the vehicle. Any characteristic of the powertrain that shows differently from when the vehicle moves on a flat road can be used. For example, instead of a torque-speed curve as shown in FIG. 4, the data used that is characteristic of particular type of load may be represented by a reference curve of motor current that includes motor current data that corresponds to the applicable torque-speed curve characteristic of when the vehicle is being subject to a load associated with the applicable torque-speed curve. In this instance the motor current of the vehicle may be sampled and such sampled values compared to those in the reference curve of motor current to determine if the vehicle is being subject to the load associated with the applicable curve of motor current and corresponding torque-speed curve (e.g., to determine whether the vehicle is traveling uphill or on a flat surface).

In some embodiments, the determination is not based on an additionally added sensor, such as G-sensor or similar.

The power train compares a torque-speed curve of load with torque and speed data. If the data is above the curve, the vehicle is determined as being climbing an incline, for example; if the data is below the curve, the vehicle is determined as being not climbing an incline or moving on a flat road. This is one way to determine a vehicle is on an incline, but others as described herein may also be used.

The operation modes may change cyclically. The comparison is conducted every second in a cycle which lasts one minute in this example. A counter is used to count how many times the vehicle is in a state of climbing an incline. When a ratio of the number of the counter to the total counting number is greater than 60%, an "eco-mode" is applied to limit some operation of the vehicle, (for example, a 3500 W power limit) to affect the current torque being applied and/or resulting battery temperature. It is not necessary for the counts to be continuous. The initiation of a mode change does not require the climbing an incline is continuous.

The load used to determine curves of load may include wind resistance, mechanical resistance, power required to climb an incline, etc. Curves of load can also be used to monitor, for example, tire pressure, the transmission system, the powertrain, the power system of the vehicle. For example, if monitoring tire pressure, data is retrieved every 10 minutes and the duration is the period between battery exchanges. For example, if the counting ratio is over 95%, one tire may need a change. In other words, tire pressure can be monitored by sampling torque speed data every ten minutes between battery exchanges and if counting ratio for sampled torque speed data is above the chosen torque speed curve chosen as a control for monitoring tire pressure (probably torque speed curve for a flat road) is over, for example 95%, the tire pressure will be determined to be low. This is based on concept that low tire pressure will increase the rolling resistance which will affect the torque speed curve.

In addition to curves of load, discrete data may be used. The change of mode can be initiated every time when the vehicle is found climbing. The change of mode can be initiated when the vehicle is found climbing for a period of time or a distance. Climbing a hill will not run fast so that the speed range with maximum torque output is reduced. In firmware, current of the motor is used to compare with current data corresponding to the curve of load. However, current can be converted into torque, which is used to compare with the curve of load.

Many curves of load may be obtained, as shown in FIG. 4. One is selected from these curves as the comparison criterion. The one is selected because points above it more likely represent the vehicle is climbing and points below it more likely represent the vehicle is not climbing.

For example, these factors may affect road load of vehicle: different test track configurations (slope, road surface, level); different ambient conditions (temperature, humidity, wind velocity, wind direction); and different vehicle configuration (tire and tire condition, body type, brakes, wheel alignment, wheel bearings, vehicle options). Other factors may also contribute to the load the vehicle is subject to.

Based on the comparison described above actual torque-speed of load data to the example standard shown in FIG. 4, the controller determines an external condition (going up a hill, traveling into a headwind, operating at high temperature) and/or an abnormal operation of the powertrain, e.g. low tire pressure, elevated friction, wheels out of alignment. In one embodiment, based on the determination, the controller implements the derating curve shown in FIG. 4 to govern max torque output of motor to control temperature of battery. The target battery temperature at which economy mode torque-speed curve is implemented (i.e., the target battery temperature at which the derating curve shown in FIG. 4 is implemented by the controller to govern max torque output of motor to control temperature of battery) is 57 Celsius, but this is only an exemplary embodiment and other target temperatures may be used instead. For example, FIG. 6 is a chart 600 showing example starting temperatures of vehicle batteries having had 100 and 500 charging cycles, respectively, and the distances traveled by the vehicle having such a battery when the battery temperature reaches 57° C. In FIG. 6, for example, 35° C. is the starting temperature of the vehicle battery. 30 km is the distance traveled by the vehicle when the battery temperature reaches 57° C. (for a battery cycled 100 times) and 18 is the distance traveled by the vehicle when the battery temperature reaches 57° C. (for battery cycled 500 times). The parentheses "( )" means the vehicle entered a "crawl home" mode first before the battery temperature reached 57° C.

Figure 7:
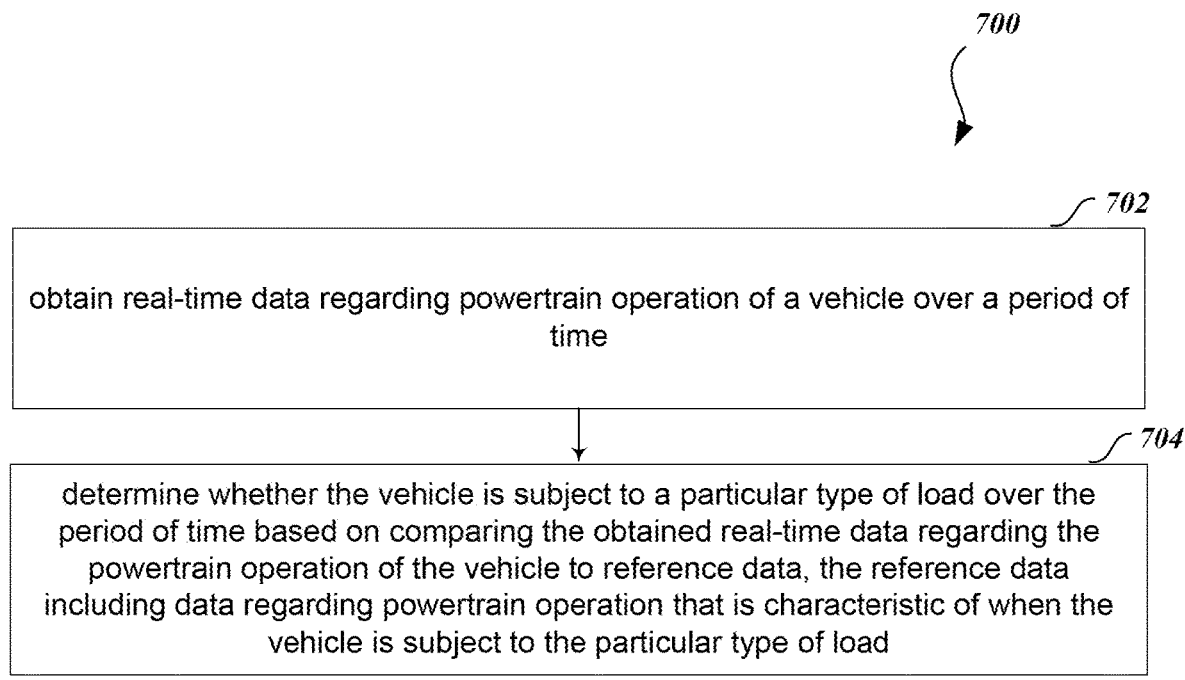
FIG. 7 is a flow diagram showing a method of vehicle load detection, according to one non-limiting illustrated embodiment.

FIG. 7 is a flow diagram showing a method 700 of vehicle load detection, according to one non-limiting illustrated embodiment.

At 702, the controller obtains real-time data regarding powertrain operation of a vehicle over a period of time.

At 704, the controller determines whether the vehicle is subject to a particular type of load over the period of time based on comparing the obtained real-time data regarding the powertrain operation of the vehicle to reference data, the reference data including data regarding powertrain operation that is characteristic of when the vehicle is subject a particular type of load.

Figure 8:
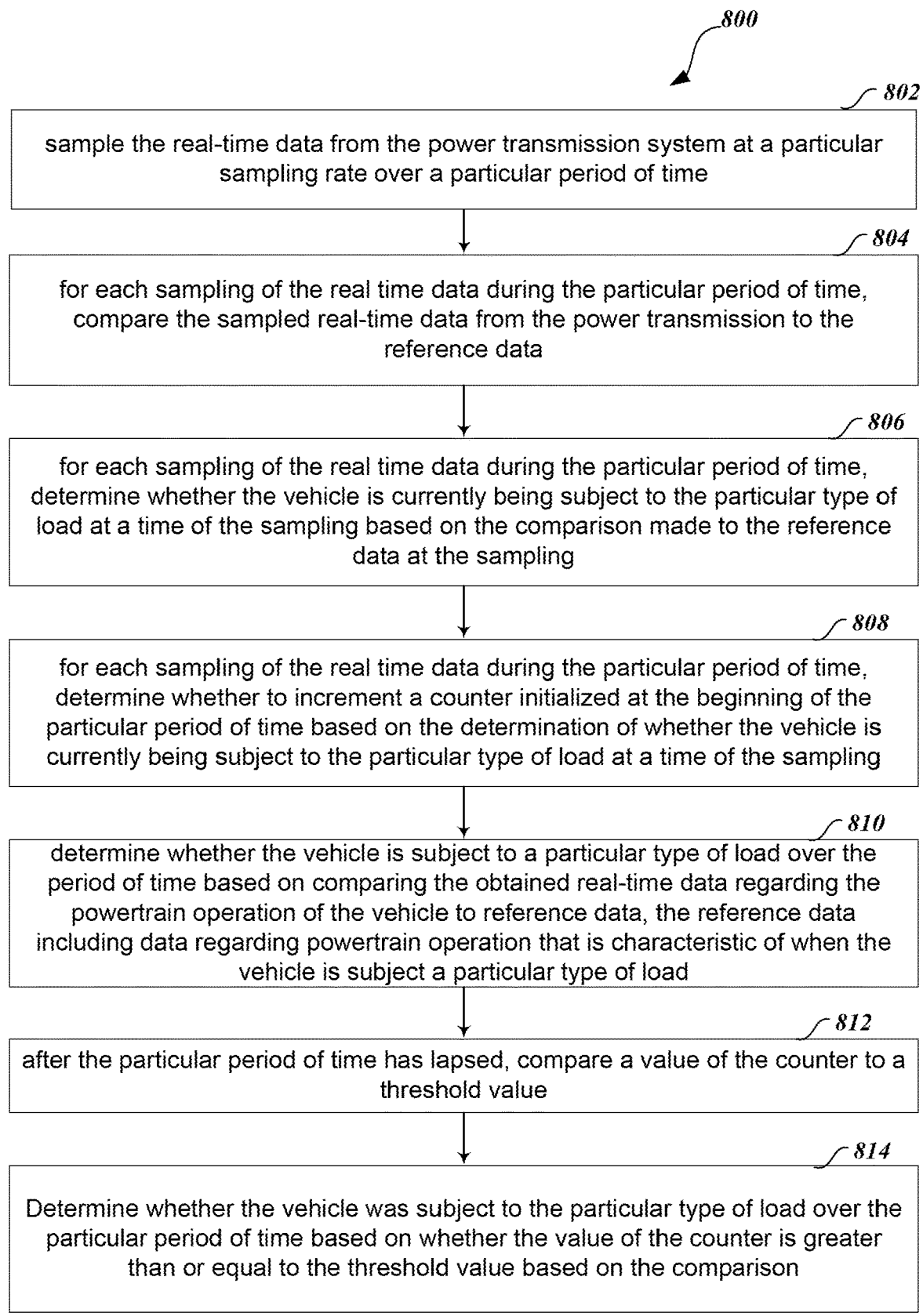
FIG. 8 is a flow diagram showing a method of determining whether the vehicle was subject to the particular type of load over the particular period of time useful in the method of vehicle load detection of FIG. 7, according to one non-limiting illustrated embodiment.

FIG. 8 is a flow diagram showing a method 800 of determining whether the vehicle was subject to the particular type of load over the particular period of time useful in the method of vehicle load detection of FIG. 7, according to one non-limiting illustrated embodiment.

At 802, the controller samples the real-time data from the power transmission system at a particular sampling rate over a particular period of time.

At 804, the controller, for each sampling of the real time data during the particular period of time, compares the sampled real-time data from the power transmission to the reference data.

At 804, the controller, for each sampling of the real time data during the particular period of time, determines whether the vehicle is currently being subject to the particular type of load at a time of the sampling based on the comparison made to the reference data at the sampling.

At 806, the controller, for each sampling of the real time data during the particular period of time, determines whether to increment a counter initialized at the beginning of the particular period of time based on the determination of whether the vehicle is currently being subject to the particular type of load at a time of the sampling.

At 808, the controller determines whether the vehicle is subject to a particular type of load over the period of time based on comparing the obtained real-time data regarding the powertrain operation of the vehicle to reference data, the reference data including data regarding powertrain operation that is characteristic of when the vehicle is subject a particular type of load.

At 812, the controller, after the particular period of time has lapsed, compares a value of the counter to a threshold value.

At 814, the controller determines whether the vehicle was subject to the particular type of load over the particular period of time based on whether the value of the counter is greater than or equal to the threshold value based on the comparison.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by on one or more controllers (e.g., microcontrollers), as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

While generally discussed in the environment and context of power system for use with personal transportation vehicle such as all-electric scooters and/or motorbikes, the teachings herein can be applied in a wide variety of other environments, including other vehicular as well as non-vehicular environments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

We claim:

1. A method of controlling an operation of an electric vehicle having a motor, the method comprising:
    obtaining real-time data over a period of time from a power transmission system of the electric vehicle;
    sampling the real-time data at a particular sampling rate over a particular period of time;
    for each sampling of the real time data during the particular period of time:
        comparing the sampled real-time data to reference data;
        determining whether the electric vehicle is currently being subject to a load at a time of the sampling based on the comparison made to the reference data; and
        determining whether to increase a value of a counter initialized at a beginning of the particular period of time based on the determination of whether the electric vehicle is currently being subject to the load;
    after the particular period of time has lapsed, comparing the value of the counter to a threshold value; and
    limiting an operational characteristic of the motor of the electric vehicle in accordance with a derated characteristic curve, when the value of the counter is greater than the threshold value so as to switch the motor to an eco-mode.

2. The method of claim 1, wherein the real-time data includes real-time data indicative of a torque or a speed of the motor, and the reference data includes a number of different torque or speed values indicative of different operating condition.

3. The method of claim 2, wherein the number of different torque or speed values are determined based on one or more reference curves.

4. The method of claim 2, further comprising:
    determining whether the electric vehicle was subject to the load over the particular period of time based on whether the value of the counter is greater than or equal to the threshold value based on the comparison.

5. The method of claim 4, wherein determining whether the electric vehicle was subject to the load over the particular period of time includes determining whether the electric vehicle was climbing an inclined surface or traveling on a flat surface based on the comparison.

6. The method of claim 4, further comprising:
    when it is determined that the electric vehicle was subject to the load over the particular period of time, causing the electric vehicle to take an action.

7. The method of claim 6, wherein causing the electric vehicle to take the action includes one or more of:
    limiting a voltage supplied to the motor;
    limiting an acceleration of the electric vehicle;
    limiting a current supplied to the motor; or
    adjusting a temperature of a battery powering the motor.

8. The method of claim 3, wherein the one or more reference curves are indicative of whether the electric vehicle carries one or more persons.

9. An electric vehicle, comprising:
    a motor configured to drive at least one wheel of the vehicle;
    a main electrical power storage device that stores power;
    a power supply operable to selectively transfer electrical power between the main electrical power storage device and the motor; and
    a controller communicatively coupled to the power supply, wherein the controller is configured to:
        sample the real-time data at a particular sampling rate over a particular period of time;
        for each sampling of the real time data during the particular period of time:
            compare the sampled real-time data to reference data;
            determine whether the electric vehicle is currently being subject to a load at a time of the sampling based on the comparison made to the reference data; and
            determine whether to increase a value of a counter initialized at a beginning of the particular period of time based on the determination of whether the electric vehicle is currently being subject to the load;
        after the particular period of time has lapsed, compare the value of the counter to a threshold value; and
        limit an operational characteristic of the motor of the electric vehicle in accordance with a derated characteristic curve, when the value of the counter is greater than the threshold value so as to switch the motor to an eco-mode.

10. The electric vehicle of claim 9, wherein the real-time data includes real-time data indicative of a torque or a speed of the motor, and the reference data includes a number of different torque or speed values indicative of different operating condition, and wherein the torque or speed values are determined based on one or more reference curves.

11. The electric vehicle of claim 10, wherein the controller is further configured to determine whether the electric vehicle was subject to the load over the particular period of time based on whether the value of the counter is greater than or equal to the threshold value based on the comparison.

12. The electric vehicle of claim 11, wherein the controller is further configured to govern a maximum torque output of motor, limit a voltage supplied to the motor, limit an acceleration of the electric vehicle, limit a current supplied to the motor, or adjust a temperature of a battery powering the motor when it is determined that the electric vehicle was subject to the load over the particular period of time.

13. A non-transitory computer readable storage medium having computer executable instructions stored thereon that, when executed, cause at least one processor of an electric vehicle to:
　sample real-time data at a particular sampling rate over a particular period of time;
　for each sampling of the real time data during the particular period of time:
　　compare the sampled real-time data to reference data;
　　determine whether the electric vehicle is currently being subject to a load at a time of the sampling based on the comparison made to the reference data; and
　　determine whether to increase a value of a counter initialized at a beginning of the particular period of time based on the determination of whether the electric vehicle is currently being subject to the load;
　after the particular period of time has lapsed, compare the value of the counter to a threshold value; and
　limit an operational characteristic of a motor of the electric vehicle in accordance with a derated characteristic curve, when the value of the counter is greater than the threshold value so as to switch the motor to an eco-mode.

14. The computer readable medium of claim 13, wherein the real-time data includes real-time data indicative of a torque or a speed of the motor, and the reference data includes a number of different torque or speed values indicative of different operating condition; and wherein the torque or speed values are determined based on one or more reference curves.

15. The computer readable medium of claim 14, wherein the computer executable instructions stored on the computer readable medium further cause the at least one processor to:
　determine whether the electric vehicle was subject to the load over the particular period of time based on whether the value of the counter is greater than or equal to the threshold value based on the comparison; and
　govern a maximum torque output of the motor, limit a voltage supplied to the motor, limit an acceleration of the electric vehicle, limit a current supplied to the motor, or adjust a temperature of a battery powering the motor when it is determined that the electric vehicle was subject to the load over the particular period of time.

* * * * *